Patented May 14, 1946

2,400,090

UNITED STATES PATENT OFFICE 2,400,090

HYDROCARBON ISOMERIZATION

Robert W. Henry, Bartlesville, Okla., assignor to Phillips Petroleum Company, a corporation of Delaware No Drawing. Application October 5, 1942, Serial No. 460,869

2 Claims. (Cl. 260—683.5)

This invention relates to the isomerization of hydrocarbons, and more particularly to the isomerization of low boiling paraffin hydrocarbons.

It has long been known that paraffin hydrocarbons can be converted into other paraffin hydrocarbons of different molecular structure. Thus, in the presence of various metal halide catalysts such as aluminum chloride or bromide, ferric chloride or bromide, and the like, normal butane may be converted into isobutane, normal pentane can be converted into isopentane, various hexanes can be converted into other hexanes, etc. Such reactions may be carried out with particular facility in the presence also of a hydrogen halide, particularly a hydrogen halide corresponding to the metal halide used. Although some destructive reactions often occur during such isomerization, and are sometimes considered to be included under the term isomerization when this term is used broadly, such as when isobutane is formed during the isomerization of normal pentane or normal hexane, the isomerization is generally conducted under conditions such that destructive reactions are at a minimum. Such simple straight-forward isomerizations are reversible, and equilibrium concentrations of isomers may be closely approached within reaction times which are not greatly prolonged by starting with any one of the isomers. Thus, isobutane may be isomerized to produce normal butane and in converting normal butane to isobutane complete conversion to isobutane in a single treatment can not be obtained regardless of the length of the reaction time.

It is possible to conduct isomerization reactions of paraffins in the presence of isomerization catalysts which maintain a relatively constant activity over long periods of time, and to conduct isomerization reactions continuously by passing the charge in a stream through a bed of such a catalyst which has a relatively uniform activity throughout the length of the reaction zone. Such a procedure is disclosed in the application of Henry and Storment Serial No. 460,868, filed October 5, 1942, and briefly comprises conducting the reaction in a long zone filled with Raschig rings, rocks, or other relatively large piece of nonadsorptive, inert supporting material coated with a metal halide catalyst, and incorporating more of said metal halide catalyst in the charge to replace continuously metal halide catalyst which is removed from the reaction zone by volatilization, solution, and/or degradation reactions. However, as equilibrium is approached in the reacting material toward the end of the reaction zone the rate of net formation of the desired product, as measured by its increase in concentration, decreases, so that a long reaction time is necessary in order to secure extensive conversion. This long reaction time not only affords an opportunity for undesired side reactions to take place to an appreciable extent, but also necessitates the use of larger equipment than would ordinarily be necessary.

I have now found that in such a case the rate of reaction can be increased by increasing the concentration of hydrogen halide activators. Thus, although I prefer to use a catalyst, namely the metal halide, which is readily maintained at a maximum and constant activity over an extended period of time and throughout the length of a reaction zone, in practicing the present invention I maintain a relatively low concentration of hydrogen halide activator during the initial part of the reaction and increase the concentration of the hydrogen halide activator during the latter stages of the reaction. The expression, "the activity of said metal halide catalyst is substantially uniform throughout the reaction period," as used in the accompanying claims, refers to the activity of the catalyst if it were in contact with a given fixed amount of hydrogen halide activator.

It is an object of my invention to isomerize paraffin hydrocarbons.

It is a further object of my invention to effect a large extent of conversion in the isomerization of paraffins in equipment of relatively small capacity.

A further object of my invention is to control the rate of the isomerization reaction as it progresses.

Further objects and advantages of my invention will become apparent to those skilled in the art from the accompanying disclosure and discussion.

Although it seems to be practically necessary to have some hydrogen halide present when using a metal halide isomerization catalyst, to isomerize paraffin hydrocarbons, the presence of large amounts of hydrogen halide appears to promote excessively undesired side reactions and sludging of metal halide, and for this reason it is desirable to have relatively low concentrations whenever possible. However, the advantages to be gained by having an increased concentration of the hydrogen halide promoter toward the end of the reaction generally offset the small amount of undesired side reactions which take place during the short time the higher concentration of hydrogen halide is present. The most usual manner in which my invention is practiced is to pass the reactants, together with a relatively small amount of hydrogen halide, into one end of a large reaction zone and add additional increments of hydrogen halide at one or more points along the length of the reaction zone so that the concentration of hydrogen halide increases in the direction of flow of the reacting mixture. This increase need not be linear, and generally it will be desirable to have the concentration increase rapidly in the latter portion of the reaction zone so that the high concentrations of hydrogen halide are present only for a brief portion of the reaction time. The initial concentration of hydrogen halide may be of the order of about 0.5 to about 5 mol per cent, and may be increased to a total of about 6 to about 12 or 15 mol per cent in the latter part of the reaction zone. The invention may be practiced also in batch operation, although it is usually employed in continuous operation. The long reaction zone may be a single vertical or horizontal catalyst chamber, or a series of such chambers. The reactants may be present in either liquid or vapor phase, or in mixed phases, and various known expedients may be employed to control the reaction temperature. Free hydrogen may be maintained in the system, if desired.

As an example of the practice of my invention, a stream of liquid normal butane is passed at about 220° F. through a bed containing aluminum chloride to dissolve the same. This stream, mixed with about five times its own volume of liquid normal butane heated to about 300° F. and comprising additional charge and recycled normal butane is passed to the top of the first of a series of three vertical reaction chambers, and enters this first chamber at a temperature of about 215 to 220° F. and a pressure of about 250 pounds per square inch gage, being about 20 per cent in liquid phase. Hydrogen chloride is added to obtain a concentration in the resulting mixture of about 4 mol per cent. Each of the chambers is filled with a bed of one-half inch ceramic Raschig rings coated with aluminum chloride, and the aluminum chloride surface is maintained fresh and of substantially uniform activity by replacement, as it gradually disappears, from aluminum chloride contained in the charge. Sufficient hydrogen chloride is added at the inlet of the second catalyst chamber to bring the concentration up to about 5.5 mol per cent, and at the inlet of the third catalyst chamber to bring the final concentration up to about 8 mol per cent. The effluent of the third chamber, containing about 5 per cent of liquid butane and a minor amount of aluminum chloride and sludge, and also hydrogen chloride, is passed to a separator. This effluent contains about 40 per cent of isobutane, which is recovered by fractional distillation, and not more than about 1.5 per cent of hydrocarbons other than butanes produced by side reactions.

It will be appreciated that the example is illustrative, and should not be interpreted to restrict unduly my invention. The invention may be practiced in various modifications, which may be made without departing from the spirit of the disclosure and teachings or from the scope of the claims.

I claim:

1. A process for isomerizing normal butane to produce isobutane, which comprises passing a stream consisting essentially of normal butane through a bed of aluminum chloride to incorporate aluminum chloride in said stream, passing said stream together with another stream containing normal butane to the inlet of the first of three substantially identical isomerization zones for flow therethrough in series, said zones being maintained under paraffin isomerization conditions and containing relatively large pieces of nonadsorptive inert catalyst support coated with aluminum chloride, introducing said streams into said first zone under conditions such that a substantial portion thereof is in liquid phase, introducing hydrogen chloride to the inlet of said first isomerization zone to provide an intial concentration of hydrogen chloride in the reaction mixture of about 4 mol per cent, adding additional hydrogen chloride between said first and second zones and between said second and third zones to increase the concentration thereof to about 5.5 and to about 8 mol per cent in the reaction mixtures at the respective points of introduction, maintaining conditions in said zones such that evaporation of liquid phase occurs therein and the effluents of said third zone still comprise a minor portion of liquid phase, and separating isobutane from said effluents.

2. In a process for isomerizing low-boiling paraffin hydrocarbons having at least four carbon atoms per molecule which comprises contacting such a hydrocarbon with a metal halide isomerization catalyst under isomerization conditions such that the activity of said metal halide catalyst is substantially uniform throughout the reaction period, adding a hydrogen halide to the reaction mixture at the start of the reaction, and increasing the concentration of hydrogen halide in the reaction mixture as said reaction proceeds with an increasing concentration of isomeric products; the improvement which comprises increasing said concentration of hydrogen halide in a non-linear manner such that said increase is more rapid in the latter portion of the reaction and such that the high concentration of hydrogen halide is present only for a minor portion of the reaction time.

ROBERT W. HENRY.